United States Patent
Ohno et al.

(10) Patent No.: US 6,394,527 B2
(45) Date of Patent: May 28, 2002

(54) COCKPIT MODULE STRUCTURE FOR VEHICLE

(75) Inventors: Masato Ohno; Toshio Ohashi; Saburo Sakamoto; Toshiharu Watanabe; Manabu Uomoto; Takeshi Satoh; Takeshi Ogasawara; Hitoshi Suzuki; Takayuki Nishijima, all of Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/771,622

(22) Filed: Jan. 30, 2001

(30) Foreign Application Priority Data

Apr. 28, 2000 (JP) .......................... 2000-131063
Nov. 14, 2000 (JP) .......................... 2000-347178

(51) Int. Cl.$^7$ .................. B62D 25/14; B60H 1/22
(52) U.S. Cl. .................. 296/72; 296/70; 296/194; 296/203.02; 454/69; 454/127
(58) Field of Search ............. 296/70, 72, 194, 296/203.02; 454/127, 69

(56) References Cited

U.S. PATENT DOCUMENTS

| 4,805,522 | A | * | 2/1989 | Tonoe et al. ............... 454/127 |
| 5,234,246 | A | * | 8/1993 | Henigue et al. .............. 296/70 |
| 5,335,718 | A | * | 8/1994 | Smith ........................ 454/127 |
| 5,354,114 | A | * | 10/1994 | Kelman et al. ............. 296/208 |
| 5,358,300 | A | * | 10/1994 | Gray ........................... 296/70 |
| 5,673,964 | A | * | 10/1997 | Roan et al. ................. 296/208 |
| 5,707,100 | A | * | 1/1998 | Suyama et al. ............... 296/70 |
| 5,868,426 | A | * | 2/1999 | Edwards et al. .............. 296/70 |
| 5,934,733 | A | * | 8/1999 | Manwaring .................. 296/72 |
| 5,979,540 | A | * | 11/1999 | Allison et al. ............. 296/208 |
| 6,073,987 | A | * | 6/2000 | Lindberg et al. .............. 296/70 |
| 6,276,739 | B1 | * | 8/2001 | Wich ........................... 296/72 |
| 6,296,303 | B1 | * | 10/2001 | Kamiya et al. ............... 296/70 |

* cited by examiner

Primary Examiner—Stephen T. Gordon
Assistant Examiner—Greg Blankenship
(74) Attorney, Agent, or Firm—Sughrue Mion, PLLC

(57) ABSTRACT

To provide a cockpit module structure for a vehicle where large foot space and a secure and stable supported state can be secured, the body of an air conditioning unit inside which heat exchangers and opening and closing doors are installed is penetrated by a steering member.

16 Claims, 11 Drawing Sheets

COCKPIT MODULE STRUCTURE FOR VEHICLE

BACKGROUND OF THE INVENTION

1. Field of the Invention

The present invention relates to a cockpit module structure for a vehicle suitable for an automobile.

2. Description of the Related Art

Generally, in an air conditioning unit composing a part of a cockpit module for a vehicle, opening and closing doors for opening or closing a squirt hole in each mode such as a defroster outlet and a ventilation outlet are housed and arranged in addition to heat exchangers inside a body of the air conditioning unit.

The body of the air conditioning unit has a structure that the body is supported by a steering member which is long in the direction of the width of the vehicle and both ends of which are supported by the vehicle as disclosed in JP-A-7-81376 or JP-A-8-142708.

The Conventional type structure has a problem that foot space on the side of an assistant driver's seat is restricted by a blower provided to the side of the air conditioning unit because the body of the air conditioning unit has a layout structure that the body is located below a steering member.

In the meantime, as the steering member has a structure that a part is bent because of the form of the body of the air conditioning unit, workability, strength and rigidity are undesirable.

SUMMARY OF THE INVENTION

The invention provides a cockpit module structure for a vehicle wherein large foot space can be secured and an air conditioning unit can be securely supported in a stable state.

A first aspect of the invention is characterized in that the body of an air conditioning unit inside which a heat exchanger and an opening and closing door are installed is penetrated by a steering member long in the direction of the width of a vehicle and is supported by the steering member.

A second aspect of the invention is characterized in that the body of the air conditioning unit according to the first aspect of the invention is divided into plural parts and a through hole of the body of the air conditioning unit penetrated by the steering member is provided on a partition line on which the body of the air conditioning unit is divided into the plural parts.

A third aspect of the invention is characterized in that the body of the air conditioning unit according to the first aspect of the invention is divided into plural parts, and a part and the steering member are integrated.

A fourth aspect of the invention is characterized in that the heat exchangers according to the first to third aspects of the invention are arranged below the steering member.

A fifth aspect of the invention is characterized in that the steering member according to the first to fourth aspects of the invention is straight in the direction of the width of the vehicle.

A sixth aspect of the invention is characterized in that the steering member according to the first to fifth aspects of the invention penetrates the vicinity of the center of gravity of the body of the air conditioning unit.

A seventh aspect of the invention is characterized in that the steering member according to the first to sixth aspects of the invention is supported by a stay supporting a part of the body of the air conditioning unit.

An eighth aspect of the invention is characterized in that a bracket for mounting each functional part arranged in the periphery of the air conditioning unit is integrated with the body of the air conditioning unit according to the first to seventh aspects of the invention.

A ninth aspect of the invention is characterized in that a harness connected to each functional part arranged in the periphery of the body of the air conditioning unit according to the first to eighth aspects of the invention is arranged along the steering member.

A tenth aspect of the invention is characterized in that a connection of the harness according to the ninth aspect of the invention and a harness extended from the side of the vehicle is provided in an intermediate part in the direction of the width of the vehicle of the steering member.

An eleventh aspect of the invention is characterized in that a leg extended from the steering member to the rear of the vehicle is provided to the steering member according to the first to tenth aspects of the invention and a fitting part into which operation assistance equipment (subsidiary device) is fitted from the side of the end in the direction of the width of the vehicle in attachment to the vehicle is provided to the leg.

A twelfth aspect of the invention is characterized in that the leg according to the eleventh aspect of the invention is a supporting member provided to the steering member for mounting an instrument panel.

According to the first aspect of the invention, as the body of the air conditioning unit inside which the heat exchanger and the opening and closing door are installed is penetrated by the steering member long in the direction of the width of the vehicle and is supported by the steering member, a position in which the body of the air conditioning unit is arranged is lifted, and hereby, as a position in which a blower provided to the side of the body of the air conditioning unit is arranged is also lifted, foot space can be enlarged by the quantity.

According to the second aspect of the invention, in addition to the effect by the first aspect of the invention, as the body of the air conditioning unit is divided into plural parts and a through hole of the body of the air conditioning unit which the steering member penetrates is provided on a partition line on which the body of the air conditioning unit is divided into the plural parts, an upper case and a lower case can be easily bound and supported to/by the steering member by overlapping and binding the upper case and the lower case in case the body of the air conditioning unit is divided to two parts of the upper case and the lower case for example.

In addition, as the through hole is provided on the partition line on which the body of the air conditioning unit is divided, the working of the body of the air conditioning unit is facilitated.

According to the third aspect of the invention, in addition to the effect by the first aspect of the invention, as the body of the air conditioning unit is divided into plural parts and a part and the steering member are integrated, a bracket binding the steering member and the body of the air conditioning unit can be omitted, the number of parts can be reduced, the cost can be reduced and the assembling workability can be enhanced.

According to the fourth aspect of the invention, in addition to the effect by the first to third aspects of the invention, as the heat exchangers are arranged below the steering member, the body of the air conditioning unit has a layout structure that the heavy heat exchangers are arranged in the lower part of the body of the air conditioning unit, the center of gravity of the air conditioning unit becomes lower and a stable supported state can be acquired.

According to the fifth aspect of the invention, in addition to the effect by the first to fourth aspects of the invention, as the steering member is straight in the direction of the width of the vehicle, the working of the steering member is facilitated, and the strength and the rigidity can be enhanced.

According to the sixth aspect of the invention, in addition to the effect by the first to fifth aspects of the invention, as the steering member penetrates the vicinity of the center of gravity of the body of the air conditioning unit, the steering member can support the body of the air conditioning unit more stably.

According to the seventh aspect of the invention, in addition to the effect by the first to sixth aspects of the invention, as the steering member is supported by a stay that supports a part of the body of the air conditioning unit on a car body member, the steering member can be supported on the car body in an intermediate position of the vehicle in the vicinity of the body of the air conditioning unit, the strength and the rigidity of the steering member are enhanced, the steering member can be thinned, and the lightening and the degree of the freedom of the design can be enhanced.

As the stay also functions as the reinforcing member of the body of the air conditioning unit, the strength and the rigidity of the body of the air conditioning unit can be enhanced.

According to the eighth aspect of the invention, in addition to the effect by the first to seventh aspects of the invention, as a bracket for mounting each functional part arranged in the periphery of the air conditioning unit is integrated with the body of the air conditioning unit, the manhour and the machining cost can be reduced, compared with those in case the mounting bracket is provided on the body of the air conditioning unit by welding so far and the cost can be reduced.

According to the ninth aspect of the invention, in addition to the effect by the first to eighth aspects of the invention, as the harness connected to each functional part arranged in the periphery of the air conditioning unit is arranged along the steering member, interference between peripheral parts and the harness when the peripheral parts are attached can be avoided, labor such as an operator is required to hold the harness by hand is not required and labor effectiveness can be enhanced.

According to the tenth aspect of the invention, in addition to the effect by the ninth aspect of the invention, as a connection of the harness and a harness extended from the side of the vehicle is provided in an intermediate part in the direction of the width of the vehicle of the steering member, the length of the harness set every type heretofore can be made common, the flexibility is enhanced and the cost can be reduced.

According to the eleventh aspect of the invention, in addition to the effect by the first to tenth aspects of the invention, as the leg extended from the steering member to the rear of the vehicle is provided to the steering member and the fitting part into which the operation assistance equipment is fitted from the side of the end in the direction of the width of the vehicle in attachment to the vehicle is provided to the leg, interference between the harness connected to each functional part arranged in the periphery of the air conditioning unit and the operation assistance equipment can be avoided when the air conditioning unit is attached to the vehicle, compared with a conventional type in which a steering member is supported from the lower side and an air conditioning unit is attached to a vehicle, labor such as an operator is required to hold the harness by hand is not required and labor effectiveness can be enhanced.

In a cockpit module structure that various peripheral parts in addition to the air conditioning unit are subassembled beforehand before attachment to the vehicle, which is recently performed, as the operation assistance equipment is fitted from the side of the end in the direction of the width of the vehicle as described above, components covering the lower side of the steering member in addition to an integrated instrument panel can be also subassembled, modularization is accelerated and labor effectiveness can be more enhanced.

According to the twelfth aspect of the invention, as the leg according to the eleventh aspect of the invention is a supporting member provided to the steering member for mounting the instrument panel, a dedicated leg for fitting the operation assistance equipment is not required to be provided utilizing the existing supporting member and the cost can be reduced.

DETAILED DESCRIPTION OF THE PRESENT INVENTION

The present invention will be described in detail with reference to the accompanying drawings.
First Embodiment Referring to FIGS. 1 to 6, a first embodiment of the invention will be described in detail.

Figure 1:
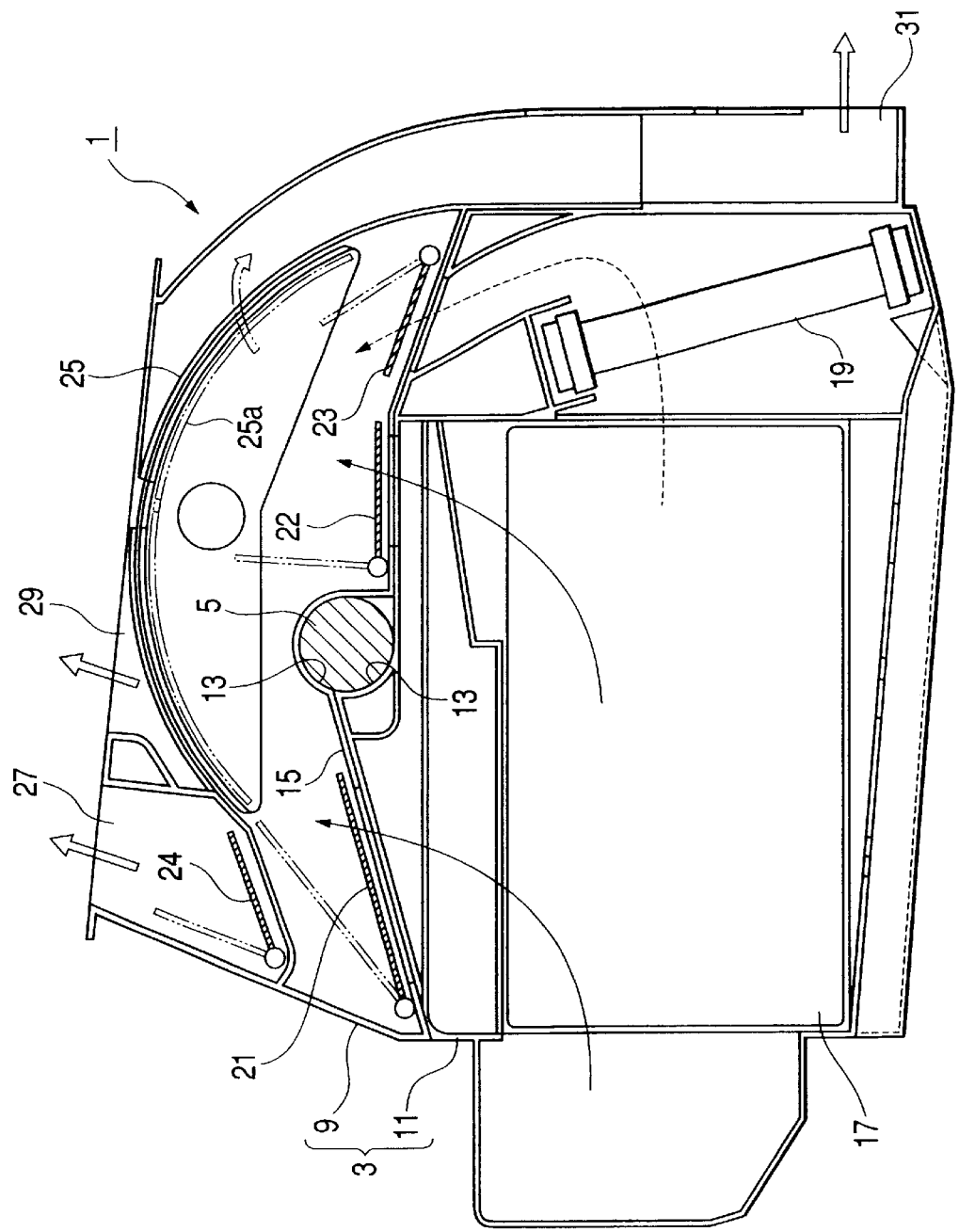
FIG. 1 is a sectional view showing an air conditioning unit structure in a first embodiment of the invention.

FIG. 1 shows an air conditioning unit 1, in which a steering member 5 penetrates a body 3 of the air conditioning unit 1.

The steering member 5 is long and straight in a direction of a width of a vehicle and each fitting 7 at both ends is fixed and supported to/by the body such as a dashboard side panel.

Figures 4A, 4B, 4C, 4D:
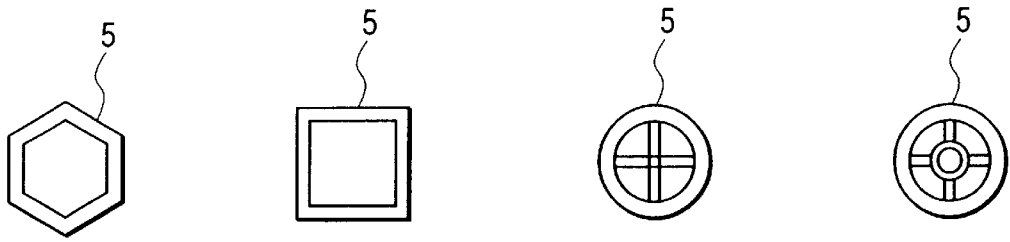
FIGS. 4A to 4D are explanatory drawings showing various sectional forms of a steering member.

The steering member 5 has a cylindrical shape having a hollow portion in sectional view for lightening. In this case, the form is not limited to a cylinder and for example, as shown in FIGS. 4A and 4B, it may be also polygonal and quadrangular. As shown in FIGS. 4C and 4D, a cross reinforcing member may be also provided inside and a double pipe structure is also enabled.

Figure 5:
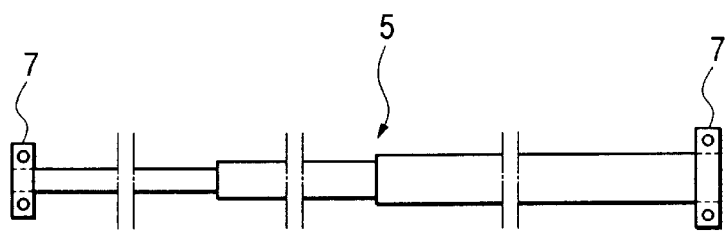
FIG. 5 is an explanatory drawing showing one embodiment of the form of the steering member.
Figure 6:
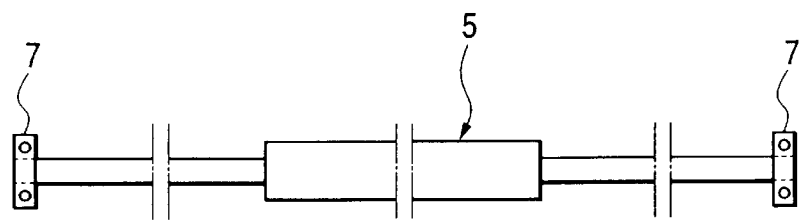
FIG. 6 is an explanatory drawing another embodiment of the form of the steering member.

When the steering member 5 is straightly formed, the diameter on the right side on which the steering wheel is installed may be also the biggest and may be also sequentially smaller as shown in FIG. 5 and as shown in FIG. 6, the diameter in the center may be also bigger, compared with the diameter on both sides.

The body 3 of the air conditioning unit is divided into an upper case 9 and a lower case 11.

A through hole 13 which the steering member 5 penetrates is provided on a partition line 15 which divides into the upper case and the lower case and the steering member 5 inside the through hole 13 passes the vicinity of the center of gravity. Hereby, a stable support state is acquired and the unstrained separation and working of the body 3 of the air conditioning unit are facilitated.

Figure 2:
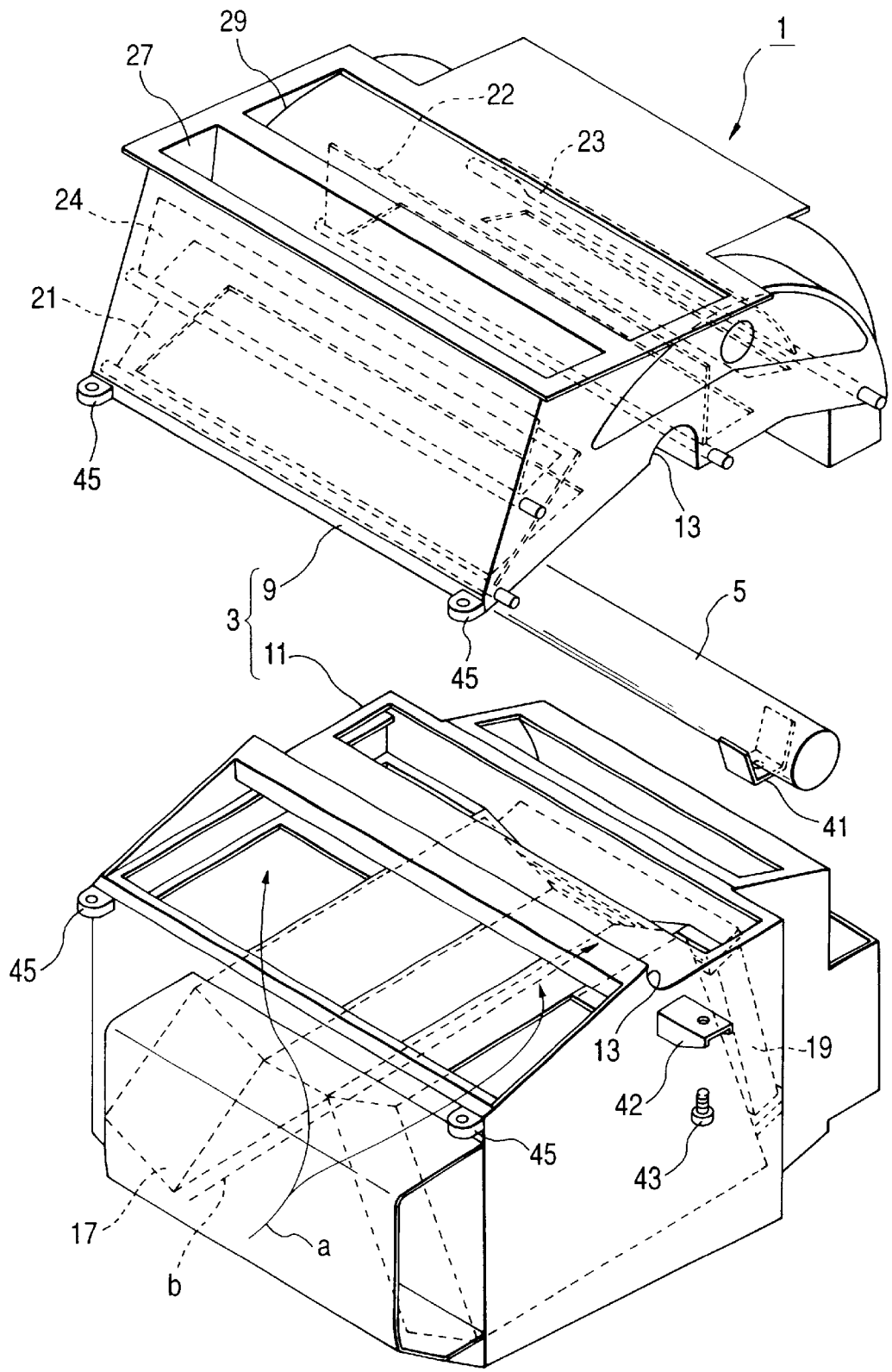
FIG. 2 is an exploded perspective view showing the air conditioning unit structure in the first embodiment.

A trapezoidal cooling heat exchanger 17 where heat exchange is performed when air guided from the outside and the inside of the vehicle gets away upward, parting right and left as shown by an arrow a in FIG. 2 for example, while as shown by an arrow b, the air can pass the inside of the heat exchanger without heat exchange as it is and a heating heat exchanger 19 arranged on the downstream side of the cooling heat exchanger 17 are housed in the lower case 11 so that the center of gravity is low.

A blower (not shown) is installed on the left side which is equivalent to the upstream side of the cooling heat exchanger 17 of the lower case 11.

First to fifth opening and closing doors 21 to 25 which can be respectively switched into states shown by a full line and a virtual line are provided in the upper case 9 and the fifth opening and closing door is a slide door.

Heat exchange is performed and the flow of a cold blast is acquired by opening the first opening and closing door 21 as shown by the virtual line in full cooling when air from the blower (not shown) passes the cooling heat exchanger 17 as shown by a full line arrow.

Heat exchange is performed and the flow of a warm blast is acquired by opening the third opening and closing door 23 as shown by the virtual line in full hotting when air from the blower (not shown) passes the heating heat exchanger 19 after the air flows inside the cooling heat exchanger 17 as it is without heat exchange as shown by a broken line arrow.

The flow of mixed air passing an alternate long and short dash line and a broken line is acquired by opening the second and third opening and closing doors 22 and 23 as shown by the virtual lines in air mixing.

The fourth opening and closing door 24 is an opening and closing door of a defroster outlet 27 and air flows toward the defroster outlet 27 by operating the fourth opening and closing door as shown by the virtual line.

The fifth opening and closing door 25 is a switching door for opening or closing a ventilation outlet 29 and a foot outlet 31, when a slide door 25a is shown by a full line, air flows toward the ventilation outlet 29 and when it is shown by a virtual line, air flows toward the foot outlet 31.

As described above, the upper case 9 is a switching zone in which each opening and closing door 21, 22, 23, 24 25 is collectively housed and arranged so that space which the steering member 5 penetrates is secured.

In this case, the partition line 15 which divides the body 3 of the air conditioning unit into the upper case 9 and the lower case 11 divides the body horizontally, however, depending upon the layout of the heat exchangers and the opening and closing doors housed and arranged in the body 3 of the air conditioning unit, the partition line may also divide the body into fore and after parts vertically or may also divide the body into right upper and left lower parts diagonally.

Figure 3:
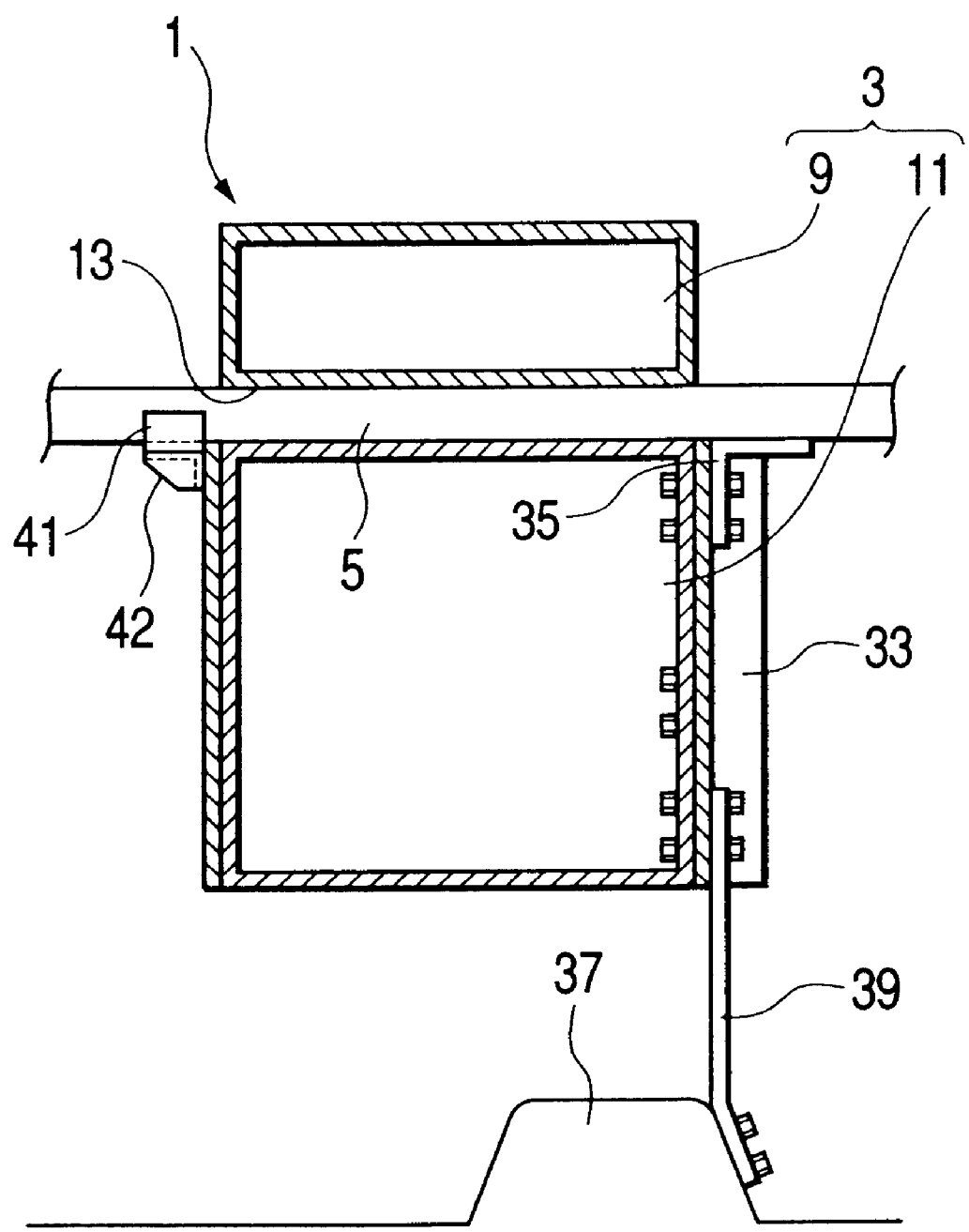
FIG. 3 is a sectional explanatory drawing showing a supported state by a stay provided to the body of an air conditioning unit.

In the meantime, of both side walls of the lower case 11 divided horizontally, a stay 33 is provided on the side wall of a driver's seat as shown in FIG. 3 and the upper end of the stay 33 is fixed and supported to/by a mounting bracket 35 of the steering member 5. The lower end of the stay 33 is fixed and supported to/by a floor tunnel 37 via a fitting 39.

As the lower case 11 is made of synthetic resin, the stay 33 may be also integrated with the side wall in forming or may be also attached to the side wall later. The former case that the stay is integrated with the lower case 11 is very desirable in workability and the cost. The stay 33 functions as a reinforcing member of the lower case 11 in which the heavy cooling heat exchanger 17 and the heavy heating heat exchanger 19 are arranged. As the strength and the rigidity are enhanced by a support structure that the intermediate part of the steering member 5 long in the direction of the width of the vehicle is supported, the lightening and the enhancement of the degree of freedom in the design are enabled by narrowing the diameter of the steering member 5.

Particularly, as the stay 33 functions as the support structure of the steering member 5 near to the driver's seat, the strength and the rigidity of the steering member 5 in a region in which the steering wheel is attached are enhanced and the stay is very desirable to prevent the vibration of the steering wheel.

Supporting flanges 41 and 42 are respectively provided to the steering member 5 and the lower case 11 on the side wall on the side of an assistant driver's seat of the lower case 11 as shown in FIG. 2 and are fixed and supported by fastening each supporting flanges 41 and 42 with a fixing bolt 43.

Faces to be bound together in another region to be the partition line 15 are fixed and supported by respectively fastening flanges 45 with fixing means.

In the air conditioning unit structure composed as described above, as the body 3 of the air conditioning unit is penetrated and supported by the steering member, the lifted arrangement of the body 3 of the air conditioning unit is enabled and large foot space is acquired.

The lower case 11 of the body 3 of the air conditioning unit in which the cooling heat exchanger 17 and the heating heat exchanger 19 are housed and arranged becomes lower in the center of gravity and the supporting rigidity is enhanced by the reinforcing member of the stay 33. Also, a secure and stable firmly supported state of the body 3 of the air conditioning unit is acquired by the straight steering member 5 passing the vicinity of the center of gravity.

Second Embodiment

FIGS. 7 to 10 show a second embodiment of the invention. In the second embodiment, the lower case 11 of the body 3 of the air conditioning unit is further into two parts and is divided into three parts as a whole differently from the structure in the first embodiment.

Therefore, the other basic structure is similar to that in the first embodiment, the same reference number is allocated to the same part and the description is omitted.

Figure 7:
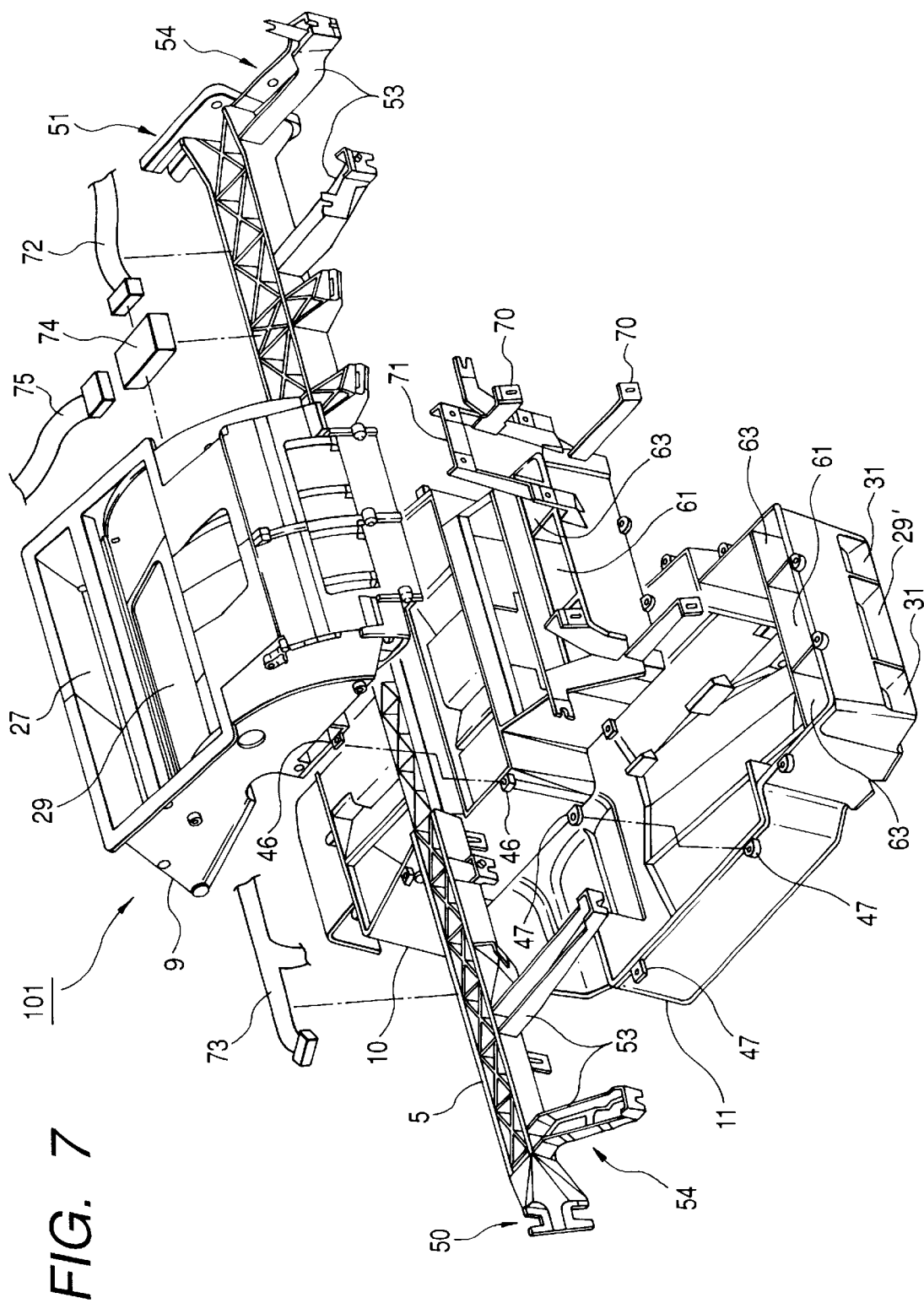
FIG. 7 is an exploded perspective view showing an air conditioning unit structure in a second embodiment of the invention.

FIG. 7 shows an air conditioning unit 101 and the body 3 of the air conditioning unit is divided into three parts of an upper case 9 and lower cases 10 and 11 in the second embodiment.

A steering member 5 is integrated on the lower case 10 arranged intermediately out of the upper case 9 and the lower cases 10 and 11 respectively divided into these three parts so that the steering member 5 penetrates the body 3 of the air conditioning unit and passes the vicinity of the center of gravity of the body 3 of the air conditioning unit.

Generally, the body 3 of the air conditioning unit is made of synthetic resin, however, in the second embodiment, the upper case 9 and the lower case 11 are made of synthetic resin and the lower case 10 with which the steering member 5 is integrated is made of light and rigid metal such as aluminum and magnesium.

The steering member 5 is long and straight in the direction of the width of a vehicle and is fixed and supported to/by the car body such as a dashboard panel in parts for attaching to the car body 50 and 51 at both ends.

The steering member 5 is in a hollow shape as shown in FIG. 7 for lightening and a cross reinforcing part is provided inside.

Also, in the second embodiment, when the steering member 5 is formed straight, it is formed so that the right side which is the side of a driver's seat where a steering wheel is installed is thicker as shown in FIG. 7, however, as described in the first embodiment, the diameter of a central part may be also bigger, compared with that of both sides.

The body 3 of the air conditioning unit is divided into three parts of the upper case 9 and the lower cases 10 and 11 as described above and a cooling heat exchanger 17 arranged trapezoidally as in the first embodiment and a heating heat exchanger 19 arranged on the downstream side of the cooling heat exchanger 17 are housed and arranged in the lower case 11 of the three parts so that the center of the gravity is low.

A blower (not shown) is installed on the side (generally, the left side which is the side of an assistant driver's seat) of the lower case 11 which is the upstream side of the cooling heat exchanger 17.

First to fifth opening and closing doors 21 to 25 which can be respectively switched to states shown by a full line and a virtual line are provided inside the upper case 9 and the fifth opening and closing door is a slide door.

Figure 8:
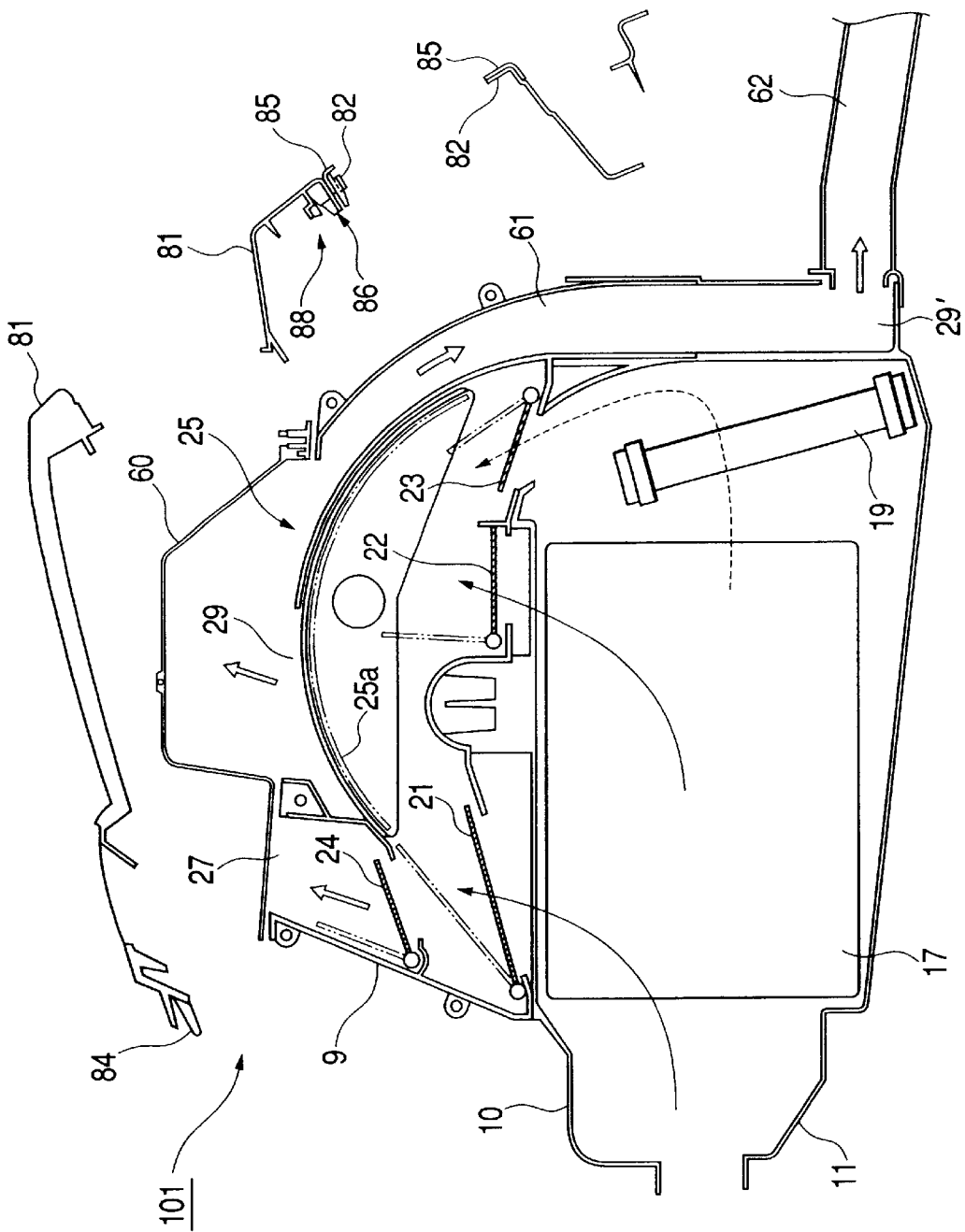
FIG. 8 is an end face view equivalent to FIG. 1 showing a ventilation outlet in the second embodiment of the invention.
Figure 9:
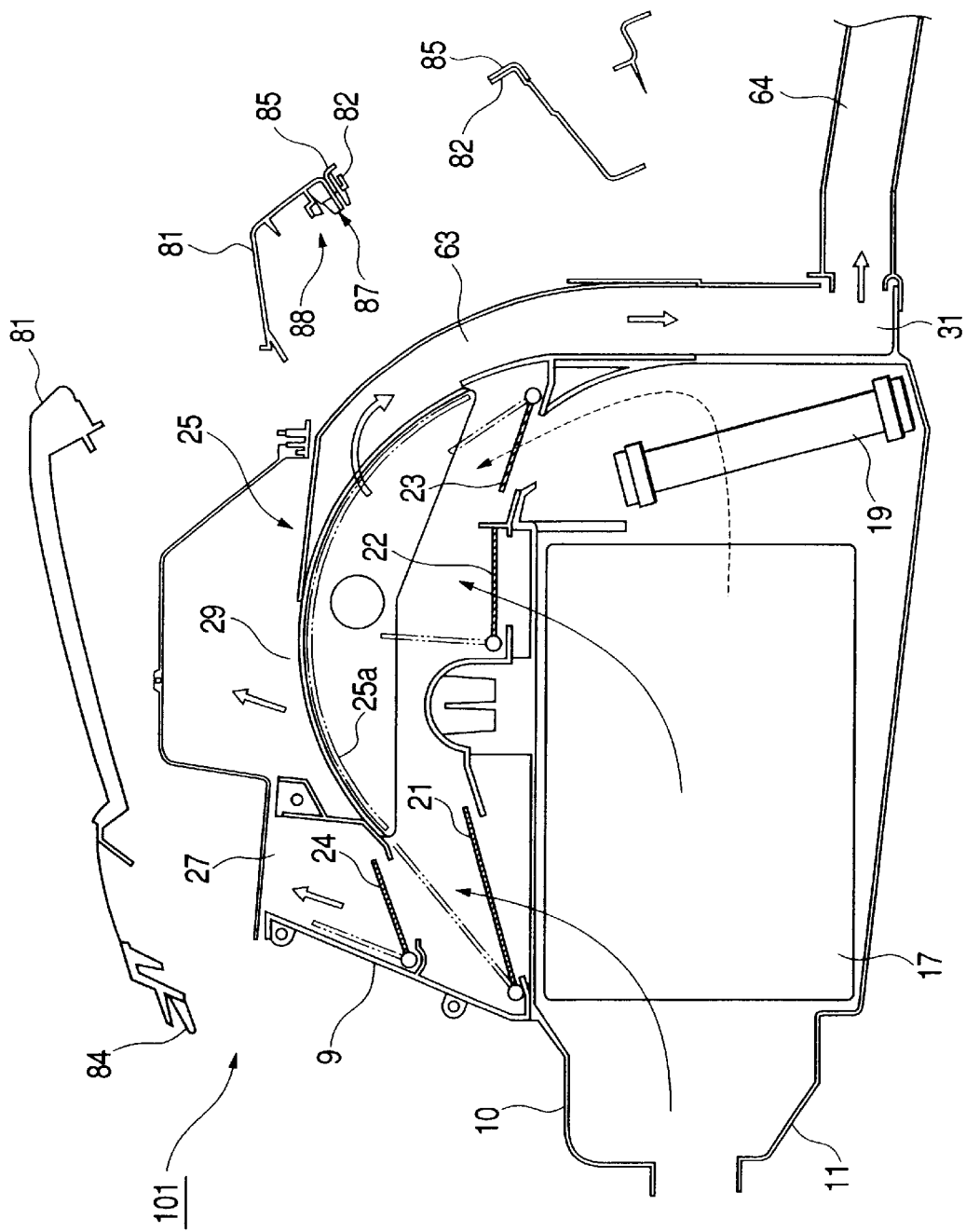
FIG. 9 is an end face view equivalent to FIG. 1 showing a foot outlet in the second embodiment of the invention.

FIGS. 8 and 9 both show the flow of air in the body 3 of the air conditioning unit. FIG. 8 shows an end face acquired by cutting the body 3 of the air conditioning unit in a ventilation outlet 29 approximately in the center, is an end face view equivalent to FIG. 1 showing the first embodiment and FIG. 9 is an end face view equivalent to FIG. 1 acquired by cutting the body in a foot outlet 31 moved slightly on the side from the ventilation outlet shown in FIG. 8.

Heat exchange is performed when air from the blower (not shown) passes the cooling heat exchanger 17 as shown by the full line and the flow of a cold blast is acquired by opening the first opening and closing door 21 as shown by the virtual line shown in FIG. 8 in full cooling.

After air from the blower (not shown) flows inside the cooling heat exchanger 17 as it is without heat exchange as shown by a broken line, heat exchange is performed when the air from the blower passes the heating heat exchanger 19 and the flow of a warm blast is acquired by opening the third opening and closing door 23 as shown by the virtual line in full hotting.

The flow of mixed air passing an alternate long and short dash line and a broken line is acquired by opening the second opening and closing door 22 and the third opening and closing door 23 as shown by the virtual lines in air mixing.

The fourth opening and closing door 24 is a door for opening or closing a defroster outlet 27 and air flows toward the defroster outlet 27 by opening the fourth opening and closing door 24 as shown by the virtual line.

The fifth opening and closing door 25 is a switching door for opening or closing the ventilation outlet 29 shown in FIG. 8 and the foot outlet 31 shown in FIG. 9, and when a slide door 25a is shown by a full line in FIG. 8, air flows toward the ventilation outlet 29.

In the second embodiment, as shown in FIG. 8, air flowing from the ventilation outlet 29 flows into a squirt hole (not shown) formed on the side of a front sheet, being distributed in the direction of the width of the vehicle via a duct 60 arranged over the ventilation outlet 29, is sent backward in the vehicle via a passage 61 formed downward on the side in the rear of the vehicle of the body 3 of the air conditioning unit and a duct 62 connected to a second ventilation outlet 29' formed at the lower end of the passage 61 and flows toward a squirt hole formed on the side of a rear sheet.

When the slide door 25a is shown by a full line in FIG. 9, air flowing from the fifth opening and closing door 25 flows toward a passage 63 formed downward on the side in the rear of the vehicle of the body 3 of the air conditioning unit and a foot outlet 31 formed at the lower end of the passage 63, is sent backward in the vehicle via a duct 64 connected to the foot outlet 31 and flows toward the squirt hole formed on the side of the rear sheet.

As described above, as in the first embodiment, the upper case 9 is a switching zone in which each opening and closing door 21, 22, 23, 24, 25 is collectively housed and arranged so that space which the steering member 5 penetrates is secured.

The faces to be bound together of the upper case 9 and the lower case 10 to be a partition line are fixed and supported by respectively fastening flanges 46 with fixing means, and the faces to be bound together of the lower cases 10 and 11 are fixed and supported by respectively fastening flanges 47 with fixing means.

Recently, there is a demand to subassemble an instrument panel 80 and various peripheral parts in addition to the body 3 of the air conditioning unit and the steering member 5 to be a module before attachment to the vehicle beforehand and to enhance labor effectiveness and in the second embodiment, as shown in FIGS. 8 and 9, the cockpit module structure in which the instrument panel 80 and each functional part (not shown) arranged in the periphery of the air conditioning unit 101 are subassembled beforehand before attachment to the vehicle is adopted for the air conditioning unit 101.

Figure 10:
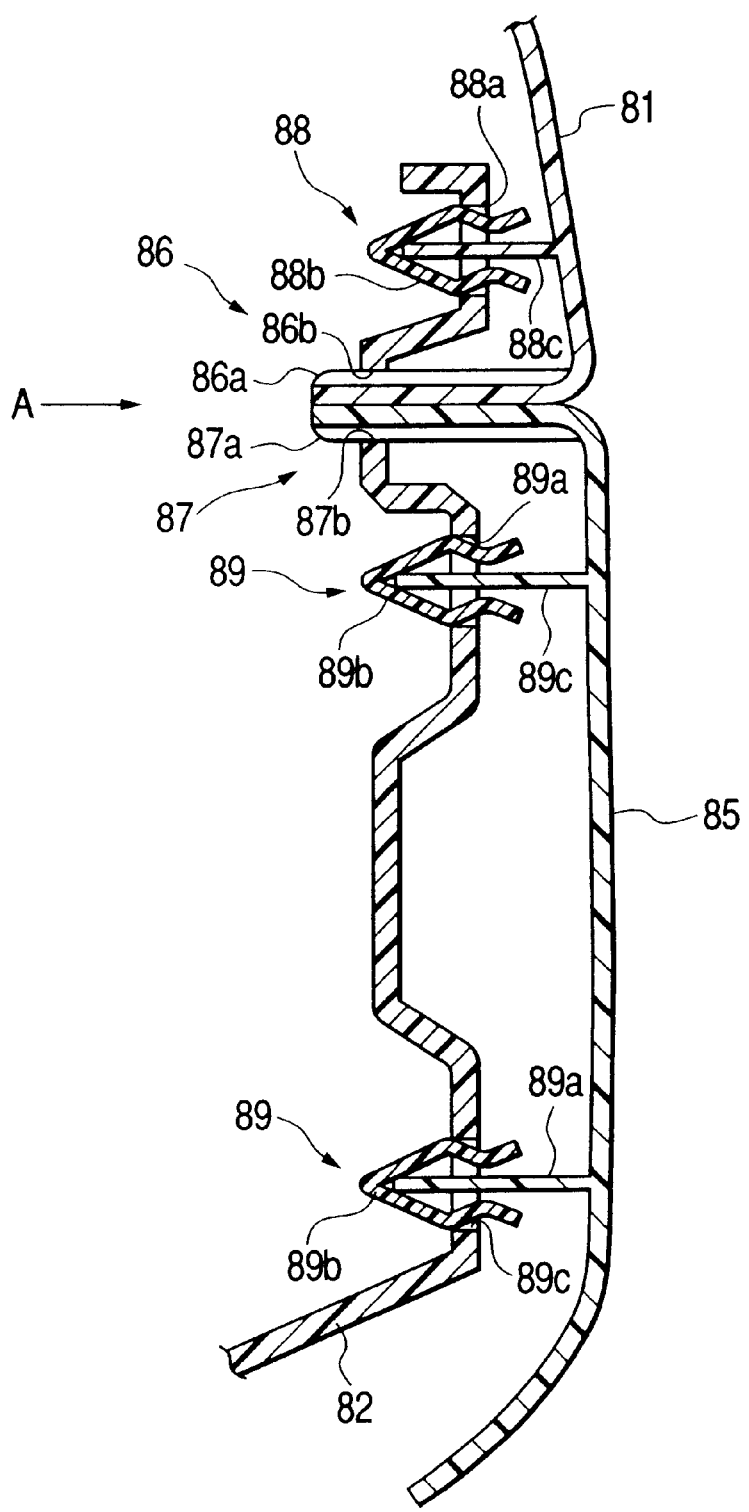
FIG. 10 is an end face view showing a junction of an instrument panel in the second embodiment of the invention.

The instrument panel 80 is divided into an upper instrument panel 81 and a lower instrument panel 82 as shown in FIGS. 8 to 10, an opening for attaching final controlling elements of the air conditioning unit, a stereo and a monitor as each functional part is formed in the center of the lower instrument panel 82 and a lid cluster 85 that covers the edge of each functional part and fittings of each functional part is provided to the opening.

FIG. 10 is an end face view showing a junction for mounting the upper instrument panel 81 and the lid cluster 85 on the lower instrument panel 82, a clip 88b made of metal or resin is provided to a convex portion 88c integrated with the upper instrument panel 81 in a general part of the upper instrument panel 81, the clip 88b is inserted into a fitting hole 88a formed in the lower instrument panel 82 and is attached to the lower instrument panel 82. In a general part of the lid cluster 85, a clip 89b made of metal or resin is also provided to a convex portion 89c integrated with the lid cluster 85, the clip 89b is inserted into a fitting hole 89a formed in the lower instrument panel 82 and is attached to the lower instrument panel 82.

A junction of the upper instrument panel 81 and the lid cluster 85 is arranged so that the surfaces at the ends of both are matched and the surfaces are fitted to the lower instrument panel 82 via fitting parts 86 and 87.

Figure 11:
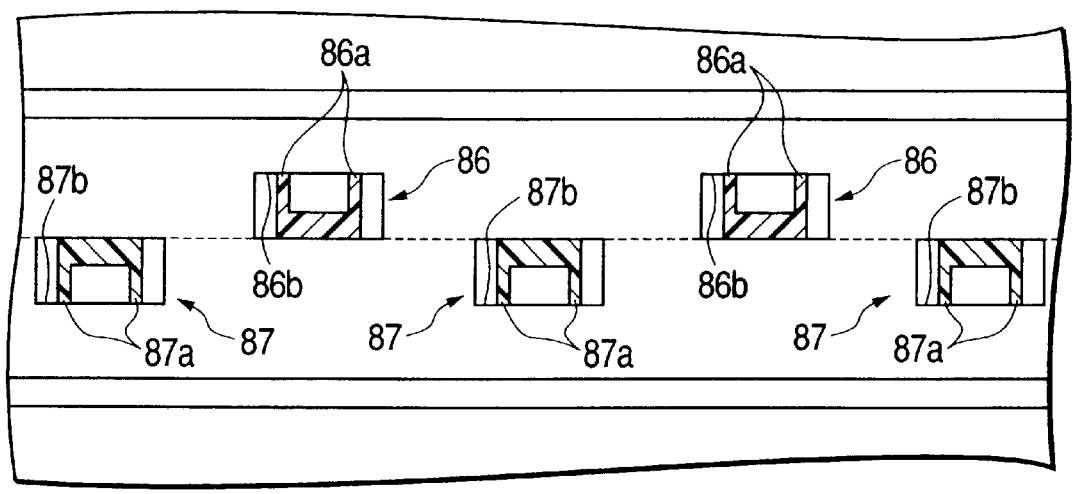
FIG. 11 is a drawing viewed from a direction shown by an arrow A in FIG. 11.

Concretely, fitting claws 86a and 87a provided to each end of the upper instrument panel 81 and the lid cluster 85 are respectively inserted into the fitting holes 86b and 87b respectively provided to the lower instrument panel 82 and the fitting parts 86 and 87 are alternately provided in different positions in the direction of the width of the vehicle as shown in FIG. 11.

The side at the fore end of the vehicle of the upper instrument panel 81 is attached to the car body (not shown) via a fitting part 84 as shown in FIGS. 8 and 9.

Even if final controlling elements of the air conditioning unit, a stereo and a monitor respectively arranged in the center of the lower instrument panel 82 are required to be replaced after they are mounted on the vehicle according to a request of a user, they can be replaced by detaching only the lid cluster 85 covering the fittings of each functional part owing to such an attachment structure, and the serviceability and the maintenance workability can be enhanced.

In the second embodiment, brackets 70 and 71 for mounting each functional part are integrated with the body 3 of the air conditioning unit.

Concretely, as described above, the mounting brackets 70 and 71 are set on the lower case 10 made of light and rigid metal material such as aluminum and magnesium and the final controlling elements of the air conditioning unit, the stereo and the monitor are arranged in the center of the instrument panel 80.

Further, harnesses 72 and 73 connected to each functional part arranged in the periphery of the air conditioning unit 101 are arranged along the steering member 5, a junction box 74 which is a connection of each harness 72, 73 and a harness 75 extended from the side of the vehicle is provided in an intermediate part in the direction of the width of the vehicle of the steering member 5 and as the steering member 5 is prismatic in this embodiment, these harnesses 72 and 73 and the junction box 74 are arranged on the upper surface of the steering member.

Also, a leg 53 extended from the steering member 5 toward the rear of the vehicle as a supporting member for mounting the instrument panel 80 at the end of the rear of the vehicle is provided to the steering member 5.

A fitting part 54 into which operation assistance equipment 90 is fitted from the side of the end in the direction of the width of the vehicle when the air conditioning unit 101 is attached to the vehicle is provided to the leg 53.

Figure 12A:
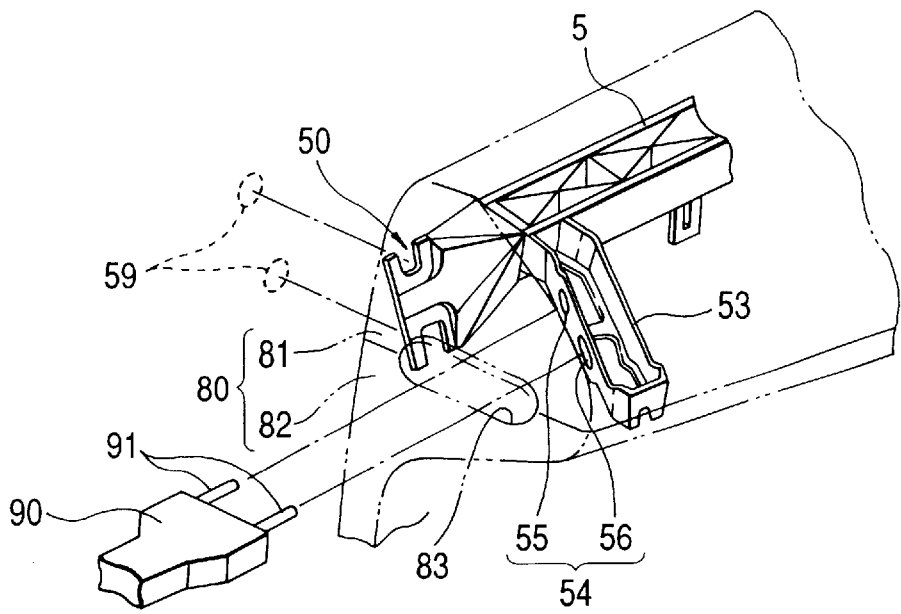
FIGS. 12A and 12B are explanatory drawings showing the end of the steering member in the second embodiment of the invention.
Figure 12B:
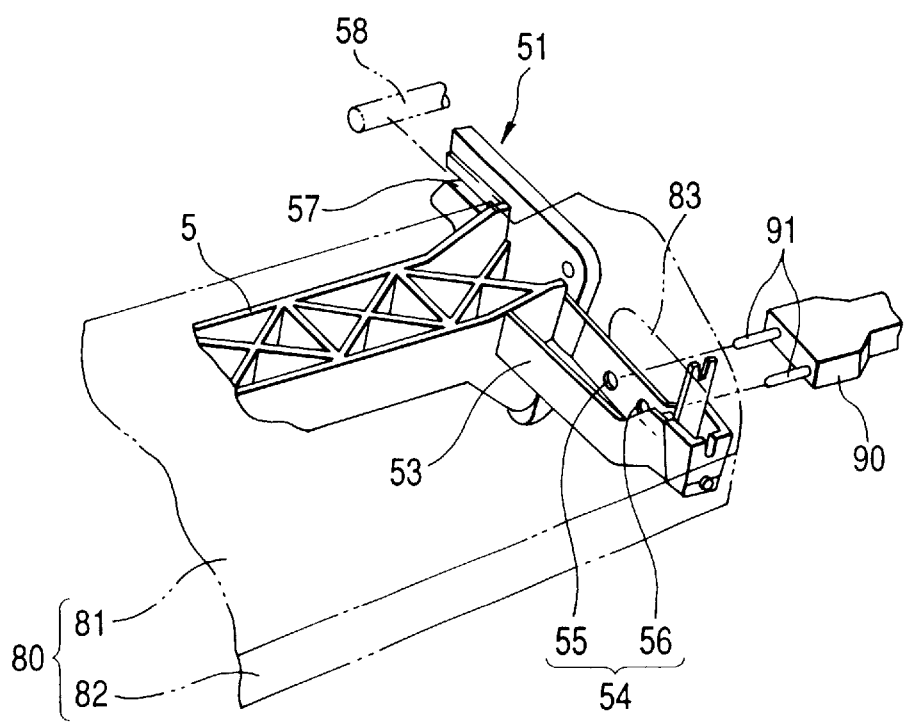

The fitting part 54 includes fitting holes 55 and 56 open by two on the right and left sides as shown in FIGS. 12A and 12B, is supported by the operation assistance equipment by fitting fitting pins 91 of the operation assistance equipment 90 into these fitting holes 55 and 56 and the air conditioning unit is attached to the vehicle from the rear of the vehicle.

At this time, a part for mounting on the car body 50 on the left side of the vehicle is attached to a fitting part 59 on the side of the car body by fixing means such as a bolt from the rear of the vehicle as shown in FIG. 12A. In the meantime, a fitting part 57 in the inverse shape of a letter C open toward the front of the vehicle is provided to a part for mounting on the car body 51 on the right side of the vehicle which is the side of the driver's seat, is fitted to a convex portion 58 set on the side of the car body and is supported by the portion.

One of the fitting holes 55 and 56 is formed in the shape of a long hole so that an error in a dimension between the fitting hole and each of the fitting pins 91 of the operation assistance equipment 90 is absorbed.

Figure 13:
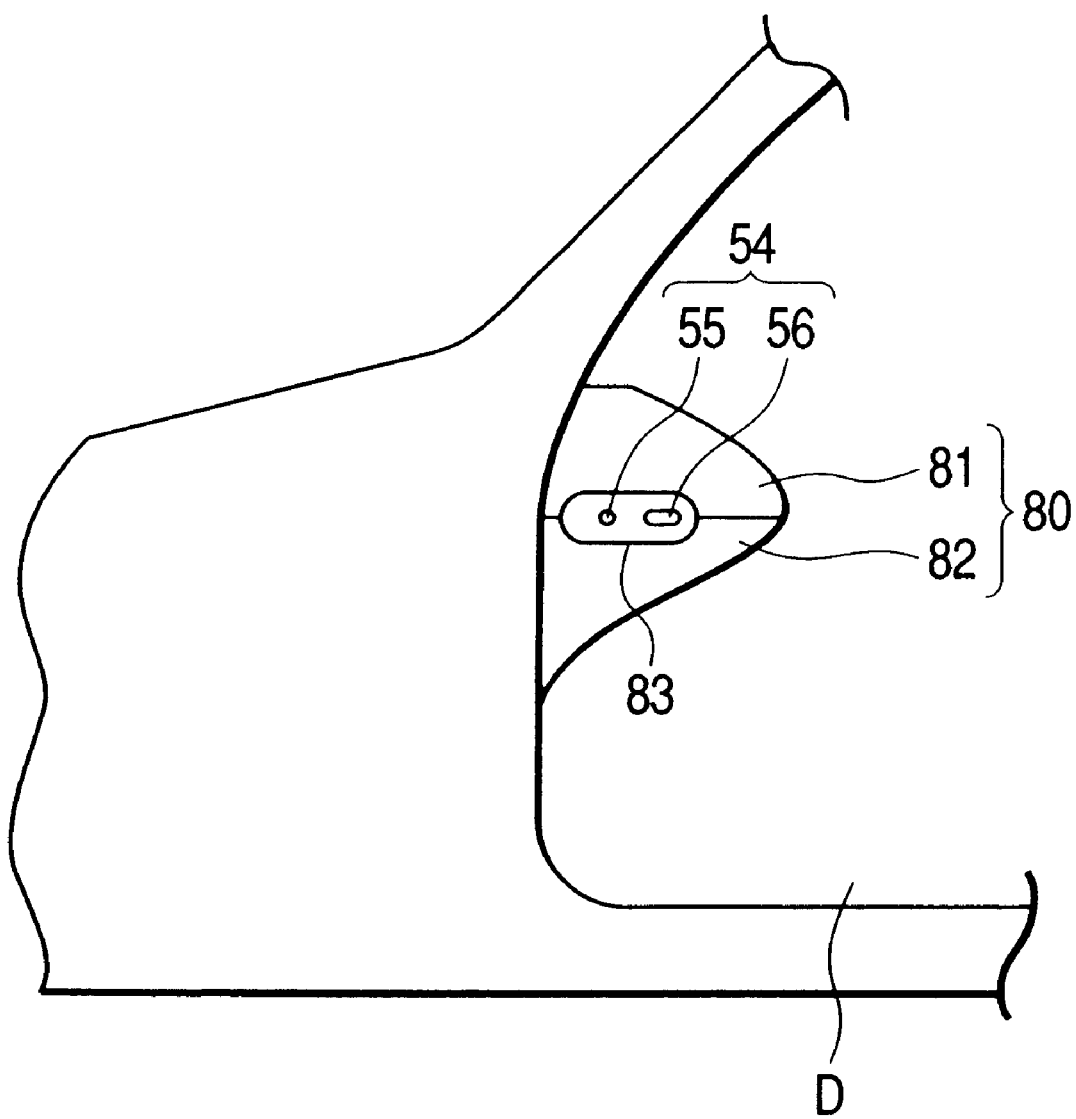
FIG. 13 is an explanatory drawing viewed from the side of a vehicle in the second embodiment of the invention.

Therefore, in the cockpit module structure as in the second embodiment, as shown in FIGS. 12A, 12B and 13, a work hole 83 into which the operation assistance equipment 90 can be inserted from the side of the end in the direction of the width of the vehicle is provided to the instrument panel 80.

According to the structure equivalent to the second embodiment described above, as the low case 10 of the body 3 of the air conditioning unit divided into the plural parts and the steering member are integrated in addition to effect that large foot space can be acquired because the position in which the body 3 of the air conditioning unit is arranged is lifted and hereby, the position in which the blower (not shown) provided to the side of the body 3 of the air conditioning unit is arranged is also lifted, a bracket binding the steering member 5 and the body 3 of the air conditioning unit can be omitted, the number of parts can be reduced, the cost can be reduced and the assembling workability can be enhanced.

As the heat exchangers 17 and 19 are arranged below the steering member 5, a layout structure that the heavy heat exchangers 17 and 19 are arranged on the side of the lower case of the body 3 of the air conditioning unit is acquired, the center of gravity becomes lower and a stable supported state of the body 3 of the air conditioning unit can be acquired.

Further, as the steering member 5 is straight in the direction of the width of the vehicle, the working is facilitated, the strength and the rigidity can be enhanced and in addition, as the steering member 5 penetrates the vicinity of the center of gravity of the body 3 of the air conditioning unit, the body 3 of the air conditioning unit can be supported more stably.

Particularly, according to the second embodiment, in addition to the above, as the brackets 70 and 71 for mounting each functional part arranged in the periphery of the air conditioning unit 101 are integrated with the lower case 10 of the body 3 of the air conditioning unit, the manhour and the machining cost can be reduced, compared with a conventional type that mounting brackets 70 and 71 are provided to the body 3 of the air conditioning unit by welding and the cost can be reduced.

In addition, the harnesses 72 and 73 connected to each functional part are arranged along the upper surface of the steering member 5, interference between a peripheral part and each harness 72, 73 can be avoided when the peripheral part such as the instrument panel 80 is attached, labor such as an operator is required to hold the harnesses 72 and 73 by hand is not required and labor effectiveness can be enhanced.

Further, as the junction box 74 which is a connection of each harness 72, 73 and the harness 75 extended from the side of the vehicle is provided to the intermediate part in the direction of the width of the vehicle of the steering member 5, the length set every type heretofore of the harnesses 72 and 73 can be made common, the flexibility is enhanced and the cost can be reduced.

In the meantime, as the leg 53 extended from the steering member 5 toward the rear of the vehicle is provided to the steering member 5 and the fitting part 54 into which the operation assistance equipment 90 is fitted from the side of the end in the direction of the width of the vehicle in attachment to the vehicle is provided to the leg 53, interference between each harness 72, 73 connected to each functional part arranged in the periphery of the air conditioning unit 101 and the operation assistance equipment 90 can be avoided when the air conditioning unit 101 is attached to the vehicle, compared with a conventional type that the steering member 5 is supported from the lower side and is attached to the vehicle and labor effectiveness can be more enhanced.

Particularly, in the case of the cockpit module structure that various peripheral parts in addition to the air conditioning unit 101 are subassembled beforehand before attachment to the vehicle, as the fitting part 54 is in a range of a door opening D as shown in FIG. 13, the operation assistance equipment 90 can be fitted from the side of the end in the direction of the width of the vehicle as described above, components covering the lower side of the steering member 5 such as the lower instrument panel 82 can be also subassembled, modularization is accelerated and labor effectiveness can be enhanced. In addition, not only the instrument panel 80 divided into the upper and lower parts in this embodiment but an integrated instrument panel can be used and the degree of the freedom of the design can be also enhanced.

Further, as the leg 53 is a supporting member provided to the steering member 5 for mounting the instrument panel 80, the existing member is utilized and as no dedicated leg for fitting the operation assistance equipment 90 is provided, the cost can be reduced.

In the second embodiment, a stay 33 that supports a part of the body 3 of the air conditioning unit is omitted, however, it need scarcely be said that in case the stay 33 is provided, the similar effect to that in the first embodiment can be acquired.

What is claimed is:

1. A cockpit module for a vehicle comprising:
    an air conditioning unit including a heat exchanger and an opening and closing door; and
    a steering member elongating in a width direction of the vehicle, the steering member penetrating and supporting the air conditioning unit.
2. The cockpit module according to claim 1 wherein the air conditioning unit includes a first case and a second case disposed on the first case; and
    a through hole is defined between the first case and the second case, through which the steering member penetrates the air conditioning unit.
3. The cockpit module according to claim 1 wherein the air conditioning unit includes a first case and a second case disposed on the first case; and
    the steering member is integrally formed with one of the first case and second case.
4. The cockpit module according to claim 1 wherein the heat exchanger is disposed below the steering member.
5. The cockpit module according to claim 1 wherein the steering member straightly elongates in the width direction of the vehicle.
6. The cockpit module according to claim 1 wherein the steering member is disposed in the vicinity of the center of gravity of the air conditioning unit.
7. The cockpit module according to claim 1 further comprising a stay for supporting a part of the air conditioning unit and the steering member.
8. The cockpit module according to claim 1 further comprising a bracket for mounting a functional unit arranged in the periphery of the air conditioning unit, the bracket integrally formed with the air conditioning unit.
9. The cockpit module according to claim 1 further comprising a harness to be connected to a functional unit arranged in the periphery of the body of the air conditioning unit, the harness arranged along the steering member.
10. The cockpit module according to claim 9 further comprising a connection portion for connecting the harness with a harness extended from the vehicle, the connection portion arranged at an intermediate part of the steering member.
11. The cockpit module according to claim 1 wherein the steering member includes a leg extended from the steering member to the rear of the vehicle; and
    the leg has a fitting portion for fitting operation assistance equipment from an side end of the steering member.
12. The cockpit module according to claim 11 wherein the leg provided to the steering member supports and mounts an instrument panel of the vehicle.
13. The cockpit module according to claim 2 wherein one of the first case and the second case comprises a plurality of cases each disposed one on another.
14. The cockpit module according to claim 2 wherein both of the first case and the second case comprise a plurality of cases each disposed one on another, respectively.
15. The cockpit module accrding to claim 7 wherein the stay is attached to one of the first and second members.
16. The cockpit module according to claim 7 wherein the stay is integrally formed with one of the first and second members.

* * * * *